United States Patent Office 2,924,531
Patented Feb. 9, 1960

2,924,531

PROCESS FOR MAKING FLAVORED
STERILIZED MILK DRINKS

Aubrey P. Stewart, Jr., San Francisco, Robert A. Johnson, San Jose, and Patricia T. Anderson, San Francisco, Calif., said Johnson and said Anderson assignors to said Stewart, Jr., now of Los Angeles, Calif.

No Drawing. Application March 16, 1955
Serial No. 494,808

2 Claims. (Cl. 99—212)

This invention relates to a new and improved process for preparing sterilized flavored milk drinks, including flavored whole milk, flavored skim milk, flavored concentrated whole milk, flavored concentrated skim milk, flavored partially defatted whole milk and flavored partially defatted concentrated milk. More particularly, this invention relates to a method of flavoring such milk products after the same have been subjected to high-temperature, short-time sterilization to provide sterile end products having improved flavor retention and color retention properties and to provide sterile end products devoid of heat-coagulated proteins.

In recent years there have been developed processes for the high-temperature, short-time sterilization of dairy products and for the aseptic canning of these products. Through the use of high temperatures, in the range of 260° F. to 300° F., and the use of short holding times, in the range of a fraction of a second to five minutes, sterility can be obtained without development of the high degree of cooked flavor produced by lower-temperature, longer-time sterilization. To achieve high-temperature, short-time sterilization, it is customary to heat the fluid milk or dairy product by pumping it through a high velocity tubular heater, a steam injection heater, or a steam jacketed tube which is provided with an agitator to provide rapid heat transfer. Following its passage through the heater, the product is passed through a holding tube to provide sufficient holding time to sterilize the product. Then the product is cooled by passage through a previously sterilized cooler, filled into previously sterilized cans, and sealed with previously sterilized lids. The filling of the cans and sealing in at atmosphere free of bacteria is known as aseptic canning.

Although high-temperature, short time sterilization, when applied to milk, produces a sterile milk with a very low degree of cooked flavor, its use in the production of flavored milk and milk drinks gives rise to a number of problems hereinafter mentioned.

For example, high-temperature, short-time sterilization will coagulate the proteins of milk under a number of conditions. If the milk is concentrated, there is a greater tendency toward heat-coagulation during sterilization. Homogenization, particularly at high pressures, renders the milk more unstable to heat. Lowering the pH by increasing the acidity renders milk more unstable to heat. The addition of solvents, such as alcohol, renders the milk more unstable to heat.

Many flavors, when added to milk, will cause the resulting flavored milk to heat-coagulate when subjected to high-temperature, short-time sterilization. This is particularly true of acid types of flavors, such as orange, lemon, lime, strawberry, and other fruit flavors. In the case of acid types of flavors, the pH of the milk is lowered when the flavor is added, and thus the flavored milk will coagulate when sterilized. On the other hand, if attempts are made to increase the pH by the addition of alkaline substances, the true fruit flavor is decreased. In the case of an alcohol flavor extract, such as mint in alcohol, the de-stabilizing influence of the alcohol causes the milk to coagulate when sterilzed. The effect of such acid or solvent addition is even more detrimental when the milk is concentrated or homogenized prior to sterilization. However, homogenization is highly desirable for a sterilized milk product in order to hold the fat in suspension so that it will not rise to the surface to form an unsightly layer upon storage. Our invention has for an object the successful overcoming of these problems.

It is known that de-aeration of milk will prevent the development of oxidized flavors upon storage and also will remove objectionable taste qualities resulting from cattle feeds. This is likewise true in the case of sterilized milk products. It is important to achieve a low level of oxygen in canned sterilized flavored mlk to not only prevent objectionable oxidation of the milk components, but also to prevent objectionable oxidation of the flavoring material components. De-aeration is customarily practiced by subjecting milk to a vacuum condition. But when flavored milk is subjected to vacuum a noticeable part of the volatile flavor substances is removed and a full-flavored milk drink is not obtained. Our invention has for a further object the overcoming of this problem.

When some flavored milks are high-temperature, short-time sterilized, a substantial loss in color or objectionable change in color occurs. Furthermore, when some flavored milks are heated, a reaction occurs between the flavoring material and the milk which produces an objectionable flavor change. Our invention has for a still further object the overcoming of this problem.

According to our invention, we high-temperature, short-time sterilize the milk and then cool it in a previously sterilized cooler. Either prior to filling or after filling the milk into cans, but prior to sealing it into cans, the flavoring material is added to the cooled, sterilized milk. The flavoring material itself is sterilized separately from the milk and added to the milk in a sterile manner. Thus it is our discovery that separate high-temperature, short-time sterilization of milk and flavor material, and the proportioning of the two after cooling, followed by aseptic canning or sealing of the filled cans, provides sterile flavored milks with superior flavor, color, appearance and keeping quality. Furthermore, it is our discovery that the application of vacuum de-aeration to the milk prior to addition of the flavor material, followed by the addition of flavor material, will produce a flavored milk of low oxygen content without the loss of important volatile flavor substances.

In practice, we have prepared sterilized flavored milk drinks successfully by the following procedure, by way of examples.

*Example 1*

Lyons brand ready syrup lemon drink flavor base, made by Lyons Magnus, Inc., San Francisco, California, containing a full amount of sugar, was high-temperature, short-time sterilized at 286° F. with a holding time of 10 seconds and cooled to 80° F. in a previously sterilized cooler. The pH of the flavor base was 1.6. The flavor base was metered through a sterilized pipe into a pipe carrying sterilized, partially defatted milk with added skim milk solids. The composition of the milk was 1% fat and 10% milk-solids-not-fat. The milk was previously heated to 180° F., sprayed into a vacuum chamber maintained under 18 inches of vacuum, homogenized at 4200 pounds per square inch pressure, sterilized at 284° F. with a holding time of 26 seconds, and cooled in a previously sterilized cooler to 70° F. Proportioning of the lemon flavor was done by a metering pump which also forced the base through the sterilizer and cooler. Proportioning was such that one part by volume of lemon syrup was added to five parts by volume of deaerated, homogenized, sterilized, cooled milk. The mixture of lemon syrup and milk had a pH of 5.5. The milk prior to the addition of syrup had a pH of 6.7. From the point of the mixing of the lemon syrup and milk by the merging of the two product flow lines, the common line of blended flavored milk led to the filler, where the product was aseptically filled into sterile cans and sealed with a sterile lid. The resulting sterile milk drink showed no heat coagulation. It showed no loss of flavor or color when compared with a blend of unsterilized milk and lemon flavor.

A comparative test was made by mixing one part by volume of lemon syrup with 5 parts by volume of the milk and by then de-aerating and sterilizing the mixture. In this instance the mixture slightly heat-coagulated during heating to 180° F. prior to de-aeration and exhibited severe coagulation when sterilized at 284° F. for 26 seconds.

*Example II*

The same procedure was carried out as in Example I, except Lyons brand ready syrup orange drink flavor base was employed. This base was a ready syrup containing all the sugar needed to sweeten the final milk drink. The pH of the orange syrup was 2.2. When added to the milk in a proportion, by volume, 1 part syrup to 5 parts milk, the resulting orange flavored milk had a pH of 5.4. When syrup and milk were high-temperature, short-time sterilized separately and cooled, then proportionately mixed prior to aseptic canning, the final product was of excellent flavor and color and not heat-coagulated. When the milk and syrup were mixed together prior to de-aeration and sterilization, there was a noticeable loss in flavor, a development of a non-typical brownish shade of color, and coagulation of the proteins as the result of sterilization. Furthermore, when the de-aeration treatment was omitted, there was a noticeable loss in flavor caused by the sterilization itself on the mixture of orange syrup and milk.

*Example III*

Schilling brand pure mint flavor, made by McCormick & Co., Schilling Division, Baltimore, Maryland, in 90% alcohol was utilized to prepare a mint flavored milk drink. This flavor was high-temperature, short-time sterilized and cooled prior to proportioning into 9% solids skim milk which had previously been vacuum de-aerated at 180° F., sterilized at 286° F. for 26 seconds and cooled to 70° F. The mint flavor was proportioned into the skim milk at a ratio of one part by volume to 25 parts of skim milk. The resulting mint flavored skim milk drink was not coagulated and had a flavor comparable with that obtained in a control prepared by mixing unheated skim milk and the same mint flavor.

A control test was made by mixing the mint flavor and skim milk and by then de-aerating at 180° F. and sterilizing. Definite loss in flavor resulted from the de-aeration and, although only very slight coagulation could be noticed at the temperature of 180° F. used for de-aeration, severe coagulation occurred as the result of sterilizing at 286° F. for 26 seconds. In this example the pH of the mint flavor was 4.05, that of the skim milk 6.85, and that of the mixture 6.65. The severity of heat-coagulation of the second-mentioned control mixture was due to the destabilizing influences of the alcohol in the mint flavor.

Results similar to the foregoing were obtained by using Schilling Brand peppermint flavor in 89% alcohol.

*Example IV*

Lyons brand strawberry, root beer, wild cherry, and lime flavor bases were used in preparing flavored milk drinks. These bases were, in one series of tests, mixed with 3 parts by volume of simple sugar syrup to one part by volume of flavor base prior to sterilization and proportioning into the sterile skim milk stream. In another series of tests, the equivalent amount of sugar was added to the skim milk before sterilization. The flavor base plus syrup was mixed with the skim milk in a volume ratio of one part flavor syrup to three parts of milk. The flavor base alone was proportioned into sugared skim milk at a ratio, by volume, of one part of flavor base per 10.6 parts of milk. The following pH measurements were obtained:

| Flavor | pH of base (less sugar) | pH of 1 part base+3 parts of sugar base | pH of mixture of flavor sugar and milk |
|---|---|---|---|
| Strawberry | 1.5 | 1.8 | 5.75 |
| Root beer | 2.05 | 2.55 | 6.1 |
| Wild cherry | 1.5 | 2.85 | 5.9 |
| Lime | 2.1 | 3.5 | 6.1 |

When the flavors were sterilized separately from the skim milk and proportioned into sterilized, cooled skim milk prior to aseptic canning, the color and flavor retention of the milk was excellent. No coagulation was observed. On the other hand, when flavors and milk were mixed prior to sterilization, coagulation occurred in every instance during sterilization at 286° F. for 26 seconds. The strawberry and root beer exhibited a loss of original color when sterilized with the skim milk. Additionally a greyish color developed in the case of root beer flavored skim milk. When subjected to vacuum de-aeration there was a noticeable loss in flavor in the case of wild cherry and in the case of root beer, and there was a slight loss in flavor in the case of strawberry and in the case of lime.

When the sugar was sterilized with the milk, the resulting product, when mixed with sterilized flavor base, was slightly inferior in flavor to that obtained by mixing the sterilized milk with sterilized flavor base plus sugar.

*Example V*

Lyons brand ready orange flavor containing all the sugar needed to sweeten the milk and having a pH of 2.2 was added to the previously sterilized evaporated milks in a ratio of 1 part syrup to 2.5 parts of evaporated milk.

When the syrup was sterilized, cooled and proportioned into the previously high-temperature, short-time sterilized, cooled evaporated milk, the product showed no coagulation. When diluted back to normal fluid whole milk concentration, the product was of excellent flavor and color. However, when the evaporated milk and flavor syrup were mixed together prior to heat treatment, then heated and cooled, there was a definite and objectionable coagulation of the protein. This coagulation occurred at as low a temperature as 190° F.

*Example VI*

Lyons brand wild cherry flavor base having a pH of 1.5 was used in preparing the flavored concentrated milk drink. In this case, as the flavor base did not contain the full amount of sugar required, sugar was added to the evaporated milks in the ratio of 14 pounds of sugar per gallon of evaporated milk. The flavor base was added to the previously sterilized evaporated milk containing sugar at a ratio of 1 part of volume of flavor to 5.2 parts by volume of evaporated milk.

When the flavor base, which had been high-temperature, short-time sterilized and cooled to room temperature, and the previously high-temperature, short-time sterilization evaporated milk were mixed cold, the final product showed no coagulation, and, when diluted back to normal fluid milk concentrations, was of excellent color and flavor. When mixed together prior to the heat treatment, heated to 190° F. and cooled, the product showed a definite coagulation.

Example VII

Schillings brand pure mint flavor in 90% alcohol was used to prepare a mint flavored concentrated milk drink. This mint flavor was proportioned into the previously sterilized high-temperature, short-time evaporated milk in a ratio of 1 part by volume of mint flavor to 13 parts by volume of evaporated milk containing sugar in the ratio of 14 pounds of sugar per gallon of evaporated milk. When mixed cold, the final product showed no coagulation. When mixed, and then heated, the mixture showed coagulation when heated to 190° F. In this case the pH of the mint flavor base was 4.05.

In Examples V, VI, and VII, the high-temperature, short-time sterilized evaporated milk had been sterilized at 277° F. for 30 seconds, and had the following composition: 7.9% butterfat; and 18.0% milk-solids-not-fat.

It should be pointed out that when evaporated milk is high-temperature, short-time sterilized, a further problem of age-thickening is encountered. Thus, it may be desirable to subject the flavored condensed milk drinks made by the subject process to treatment which will inhibit such age-thickening. By way of example of such treatment, reference is had to our co-pending application, Serial Number 484,583, filed January 27, 1955. However, such age-thickening inhibiting treatment is not as important with respect to high-temperature, short-time sterilized flavored condensed milk as it is with respect to high-temperature, short-time sterilized unflavored condensed milk because the sugar content of the flavoring material has an age-thickening inhibiting function.

While the above description of the subject process has been made with specific reference to flavored milk drinks, the process is understood to be applicable to the production of a variety of products which, by virtue of their formulation, will coagulate, lose or change color and/or flavor when high-temperature, short-time sterilized, and/or de-aerated in conjunction with high-temperature, short-time sterilization, but which, according to the practices of our invention, may have their constituents separately sterilized and cooled and combined by aseptic canning without substantial changes occurring.

What is claimed is:

1. A process for making flavored sterilized milk drinks comprising subjecting milk to high-temperature, short-time sterilization, cooling the sterilized milk, separately sterilizing flavoring material, said flavoring material being chosen from the class consisting of materials which, when heated in the presence of milk, will either coagulate the milk, lose color or lose flavor, cooling said flavoring material, mixing the cooled milk and the sterile flavoring material together, and filling the mixture into sterile containers and sealing said containers under sterile conditions.

2. A process for making flavored sterilized milk drinks comprising sterilizing a liquid milk product at temperatures within the range of 260–300° F. for a time within the range of a fraction of a second to 5 minutes, cooling said sterilized milk product to a temperature within the range of normal room temperatures, sterilizing liquid flavoring material at temperatures within the range of 260–300° F. for a time within the range of a fraction of a second to 5 minutes, said flavoring material being chosen from the class consisting of material which, when heated in the presence of milk, will either coagulate the milk, lose color or lose flavor, cooling said sterilized flavoring material to a temperature within the range of normal room temperatures, mixing the cooled, sterilized milk product and the cooled, sterilized flavoring material together, and filling the mixture into containers and sealing the sterile containers under sterile conditions.

References Cited in the file of this patent

UNITED STATES PATENTS

| | | |
|---|---|---|
| Re. 19,193 | Grindrod | June 5, 1934 |
| 602,315 | Fernandez | Apr. 12, 1898 |
| 1,497,657 | Andress | June 10, 1924 |
| 1,563,020 | Davis | Nov. 24, 1925 |
| 1,710,133 | Winkler | Apr. 23, 1929 |
| 2,049,591 | Rafn | Aug. 4, 1936 |
| 2,490,599 | Otting | Dec. 6, 1949 |
| 2,491,537 | Welch | Dec. 20, 1949 |